Nov. 11, 1930. O. T. GRAHAM ET AL 1,780,973
TRUCK FOR TRANSPORTING CEMENTITIOUS MATERIALS
Original Filed Feb. 24, 1928 3 Sheets—Sheet 2
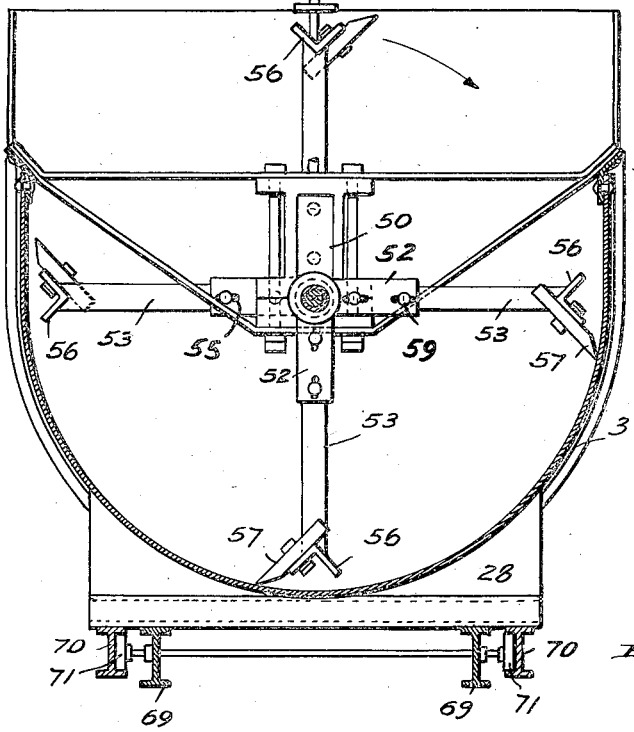
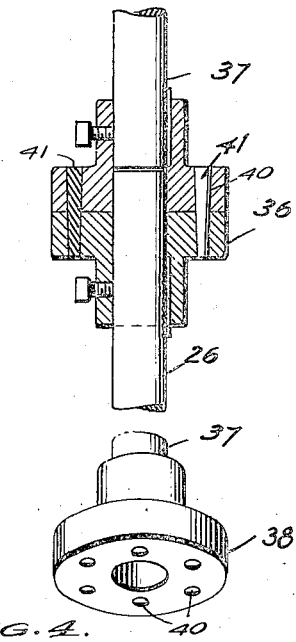
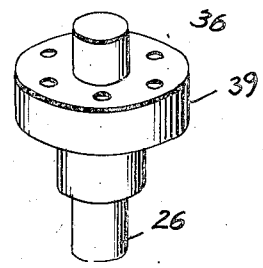
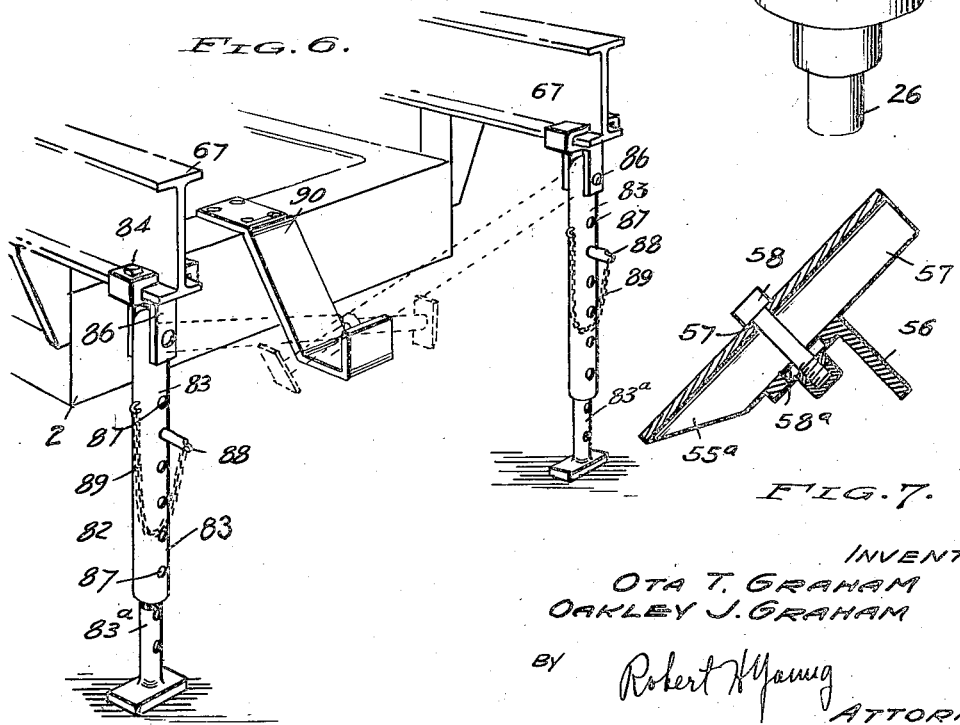
INVENTORS
OTA T. GRAHAM
OAKLEY J. GRAHAM
BY Robert H. Young
ATTORNEY

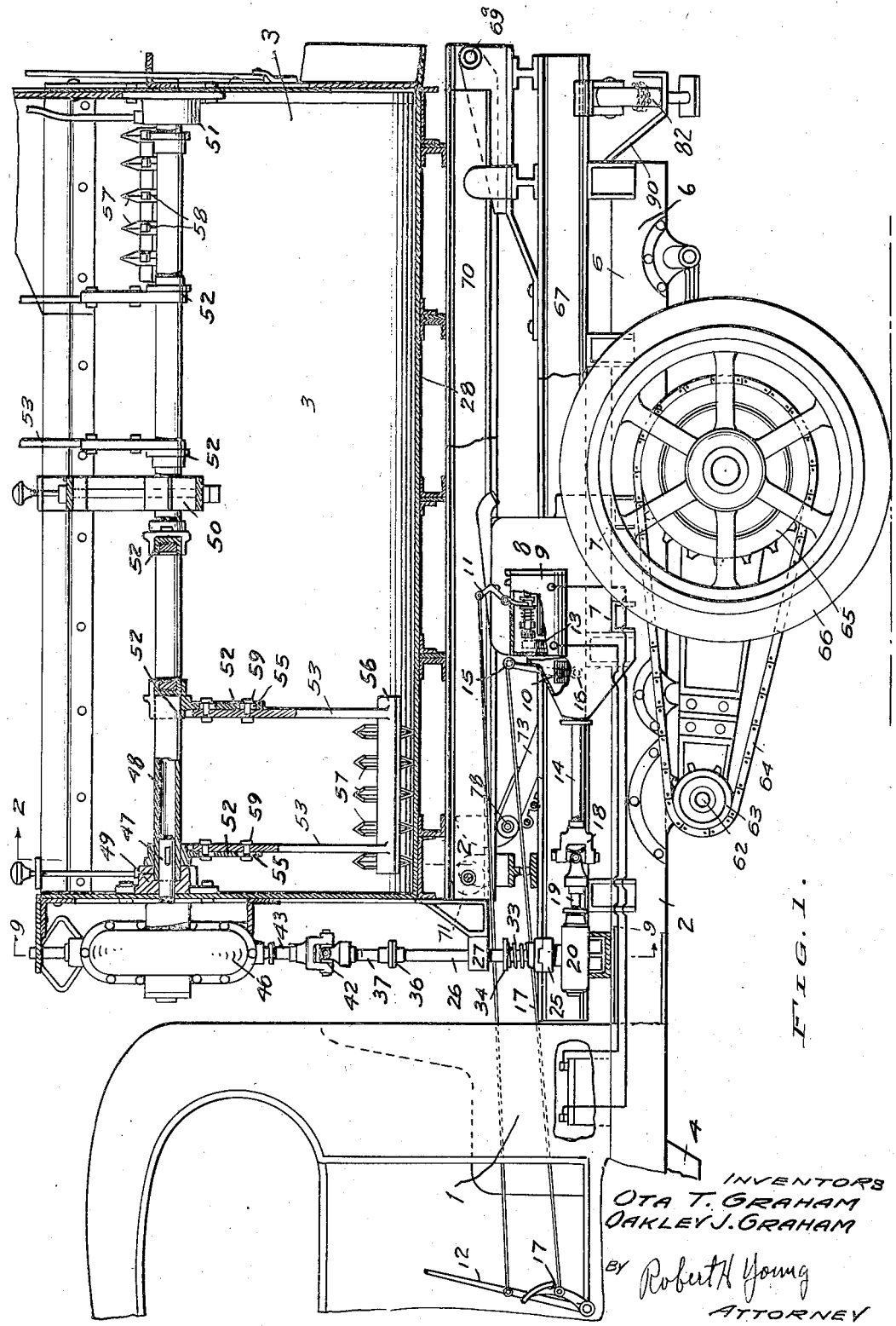

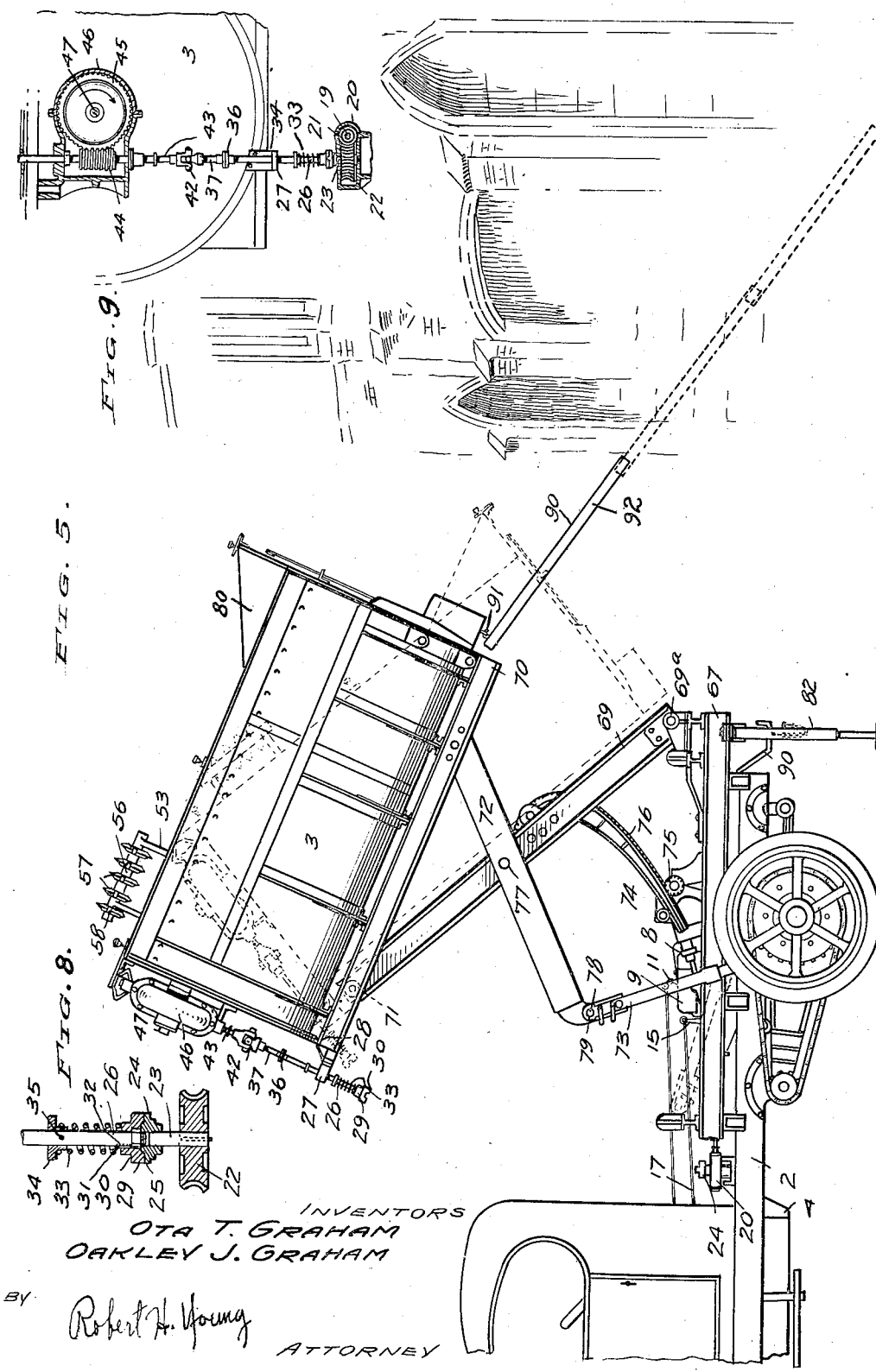

Patented Nov. 11, 1930

1,780,973

UNITED STATES PATENT OFFICE

OTA T. GRAHAM AND OAKLEY J. GRAHAM, OF RICHMOND, VIRGINIA

TRUCK FOR TRANSPORTING CEMENTITIOUS MATERIALS

Application filed February 24, 1928, Serial No. 256,710. Renewed July 29, 1930.

This invention relates in general to the art of mixing, transporting, and handling cementitious materials and is more particularly directed to improvements in a means for conveying cementitious material from a central plant to the point of use, and mixing or agitating the said material after supplying the same to the coveyor body and before dumping the same at the place of use; this invention relating to and comprising an alternate method to that disclosed in the pending application, Serial Number 184,943, filed April 19, 1927.

It is the prime object of this invention to provide, on a conveying vehicle, self propelled or otherwise, a power unit for driving the agitating or mixing device, mounted on the chassis of the vehicle.

It is a further object of our invention to provide a novel and improved type of transmission means for transmitting power from the power unit to the agitating or mixing mechanism.

An object of our invention is to provide such a separate power unit as to insure complete and continuous agitation of the plastic concrete though steep grades be encountered, where there is a motor failure in the propelling power unit of the carrying vehicle, or when the carrying vehicle is at rest and it is desired to continue the agitation of the material until dumping without the operation of the propelling power unit.

Another object of our invention is to simplify the power transmitting mechanism of the devices shown in the earlier applications above referred to.

Other objects of our invention will appear in the following specification and claims and will be disclosed in the accompanying drawings in which Figure 1 is a side elevation, largely in section, showing the agitating drive motor mounted on the chassis of the carrying truck, together with the power transmission means between said motor and the agitating elements.

Figure 2 is a detail in cross-section on the line 2—2 of Figure 1.

Figures 3 and 4 are enlarged details of the frangible safety drive mechanism.

Figure 5 is a side elevation showing the conveying body in high dumping position and showing the same in dotted lines in low dumping position.

Figure 6 is a detail of the bracing jacks.

Figure 7 is a detail showing the blade adjusting means.

Figure 8 is a detail in section of the coupling.

Figure 9 is a section on the line 9—9 of Figure 1.

The chassis 2 of the carrying unit 1 disclosed in this application as a self propelled motor truck, has a carrying or conveying body 3 mounted thereon. The truck is provided with a power unit 4 for propelling the carrying vehicle.

The chassis of the unit 1 has a frame comprised of the longitudinal members 6 and transverse members 7. A motor unit 8 is mounted on the transverse members 7 and is shown as positioned under the carrier body 28, and is adapted, as will be explained hereinafter, to operate the mixing or agitating mechanism. The power unit 8 may be equipped with a starter 9, of any suitable conventional design, and a friction clutch 10, the starting unit being disclosed as engaging the fly wheel 13 of the said motor when in starting position. The starter 9 may be equipped with a starting or contact lever 11 which is extended to a point adjacent the driver's seat by extension lever 12. The starter unit 9 is discolsed as having an electric cable attached to the terminals thereof, and electrically connected to a battery unit on the truck chassis for furnishing the energy for operating the starter when contact is made by the arm 11.

A friction clutch 10 is interposed between the fly wheel 13, mounted on the crank shaft of the power unit 8, and the drive shaft 14. The clutch is adapted to be operated by a lever 15, pivoted on the clutch casing 16 and movable about its pivot by an extension lever 17 operated from a point adjacent to the seat of the operator of the vehicle.

The shaft 14 is connected, by means of a universal joint 18, with a shaft 19 mounted in worm casing 20 supported on the chassis frame. A worm 21 on shaft 19 is adapted to drive a gear 22 fixedly mounted on shaft 23 which terminates in a coupling member 24, more clearly disclosed in Figure 8; having a substantially circular outer periphery and having a projection 25, forming the male jaw of the coupling. A shaft 26 rotating in the bearing 27 secured to the carrier body 28, is provided at its lower end with a cap 29 for retaining the complemental female member 30 of the coupling. The coupling member 30 is slidably mounted on the shaft 26 and is fixed by a key 31 bearing in a slot 32 in the said shaft, against relative rotation with respect to the shaft 26. A compression spring 33 is mounted between the member 30 and a collar 34 fixed to the shaft 26 by a pin 35. This arrangement is to provide a yieldable means for engaging the two coupling members and permits the mating portions to align themselves without breakage when the carrying body is returned to transit position.

The shaft 26 terminates at its upper end in a frangible coupling safety device 36 for connecting the said shaft to a shaft 37. This frangible coupling or safety device, as is most clearly shown in Figures 3 and 4, comprises two substantially circular members 38 and 39 keyed on, or otherwise non-rotatably fixed with respect to, shafts 26 and 37 respectively.

The members 38 and 39 are provided with a number of co-inciding apertures 40 adapted to receive tapered pins 41 of suitable frangible material which are of suitable cross sectional area to permit them to be frangible under undue stress in any part of the driving or agitating mechanism.

The upper end of the shaft 37 terminates in a universal joint 42 connecting the shaft 37 to a shaft 43, the shaft 43 having a worm gear 44 fixed thereon to drive a ring gear 45 in the casing 46. A shaft 47 is fixed to and rotates with the gear 45, the shaft being sleeved in and keyed to an agitator shaft 48. The agitator shaft 48 is tubular and is journaled in suitably lubricated bearings 49, 50 and 51, which bearings are located in the front, rear and approximate center of the body respectively.

Stub shafts 52 are welded or otherwise fixedly secured in pairs disposed at right angles to each other and to the shaft 48. Arms 53 are adjustably and fixedly secured to the stubs 52 by means of bolts 59 inserted through slots 55. The pairs of arms 55 are connected by means of horizontally extending angular bars 56 spaced from the body wall. Mixer or agitator blades 57 are adjustably secured at spaced intervals to the horizontal members 56 by means of bolts 58 inserted through slots 58ª in members 56 and apertures in blades 57. The blades 57 are thus adjustable toward and away from the body wall. The blades 57, as illustrated in Figure 7 are angular in cross section and are cut on the bias to point 55ª to throw the material away from, and between, the said blades with a minimum friction between the blades themselves and between the blades and the carrier body. This arrangement causes the coarser elements of the aggregate to be shunted between the blades and eliminates the probability of a jam between the blades and the body.

As disclosed in the drawings the truck in Figure 1 is self propelled and may be of any conventional form. As described, it has transmission means, not shown, for rotating the shafts 62, to which sprockets 63 are secured for receiving chains 64 engaging sprockets 65 of drive wheels 66. The chassis member 2 supports a supplemental frame 67 carrying the body and the elevating and dumping mechanism therefor.

The elevator mechanism is comprised essentially of a lazy tong structure as follows; members 69 pivoted to the supplemental frame at one end 69ª, pivoted at their other ends to the body frame 70 by means of rollers 71, which rollers are slidable in the flanges of the members 70; members 72 pivoted to the body frame 70 adjacent the rear end thereof, and at their other ends pivoted to members 73 which are in turn pivoted to the sub or supplemental frame 67.

In bodily elevating, the body hoisting mechanism 74 of conventional design, is thrown into engagement with a power take-off, not shown, which causes gears 75 to rotate engaging with arcuate gears 76 causing the same to elevate the arms 69 and 72, pivoted to each other at 77, so that they move upwardly. Reversal of the direction of rotation of the gears 75 causes a lowering of the body.

When the body is in elevated position as is shown in Figure 5 the center of gravity is shifted rearwardly. To prevent any tendency of the truck from tipping either rearwardly or laterally we have provided adjustable jacks 82 attached to the subframe 67 and adjustable to extend therefrom to the grade. The jacks are comprised of telescopic shafts 83 and 83ª, the shaft 83 being secured to the subframe and the shaft 83ª terminating in flanged base of suitable area. The jacks have attaching members 86 slidable onto the subframe 67, and fixedly securable thereon by bolts 84. The shaft 83 is pivotally connected to the member 86. The shafts 83 and 83ª are provided with coinciding apertures 87 through which pins 88 may be inserted to secure the telescopic shafts in any position to which they may have been adjusted. The pins 88 are attached to chains 89 which are secured to the shaft 83. In transit position the jacks are folded as indicated in dotted lines and are supported by a flanged member 90 secured to the chassis 12.

In dumping the material without elevating the body, the pins 78 are released from openings 79 thereby separating the arms 72 and 73 so that the body may be tilted about its pivot at 69ª without any bodily elevation thereof.

The carrier body is extended upwardly at its rear end as at 80 for preventing loss of material laterally of said body while the body is being moved into dumping position.

It will be noted that the motor unit is mounted deep in the frame of the chassis 2 and under the carrier body. This permits of the use of such a separable motor unit without the necessity of constructing a longer truck body than is used when the power is to be taken from the vehicle propelling unit and also tends, by its weight, to lower the center of gravity of the whole structure and hence tends to stability.

When it is desired to dump the cementitious material directly to the place of use, or when it is impossible to get sufficiently close to a hopper for a direct dump, we utilize a telescopic chute 92 removably secured by hooks 91 to the tail structure of our truck body.

While we have disclosed a preferred embodiment of our invention it is not our intention that the invention shall be restricted to the exact structure disclosed but to include any and all modifications which fall within the spirit of our invention as specified in the following claims.

Having thus described our invention what we claim is—

1. In combination, in a vehicle for conveying cementitious material and including a chassis and a propelling power unit, a body carried by said chassis and including a movable mixing element, a separate mixer power unit carried by said chassis independently of the body, and power transmission means operatively connecting said mixer power unit with said mixer element to drive the latter.

2. In combination, in a vehicle for conveying cementitious material and including a chassis and a propelling power unit, a body carried by said chassis and including a movable mixing element, a separate mixer power unit carried by said chassis independently of the body, and flexible power transmission means operatively connecting said mixer power unit with said mixer element to drive the latter.

3. In combination, in a vehicle for conveying cementitious material and including a chassis and a propelling power unit, a body carried by said chassis and including a movable mixing element, a separate mixer power unit carried by said chassis independently of the body, and power transmission means operatively connecting said mixer power unit with said mixer element to drive the latter, said transmission means including a clutch operable from a point adjacent the cab of said vehicle.

4. In combination, in a vehicle for conveying cementitious material and including a chassis and a propelling power unit, a body carried by said chassis and including a mixing element mounted rotatively with respect to said body, a separate mixer power unit carried by said chassis independently of the body, and power transmission means operatively connecting said mixer power unit with said mixer element to drive the latter, said mixer power unit including a clutch and starting mechanism operable from a point adjacent the cab of said vehicle.

5. In combination, in a vehicle for conveying cementitious material and including a chassis and a propelling power unit, a dumping body carried by said chassis and including a mixing element mounted rotatively with respect to said body, a separate mixer power unit carried by said chassis independently of the body, and flexible power transmission means operatively connecting said mixer power unit with said mixer element to drive the latter.

6. In combination, in a vehicle for conveying cementitious material and including a chassis and a propelling power unit, a dumping body carried by said chassis and including a mixing element mounted rotatively with respect to said body, a separate mixer power unit carried by said chassis independently of the body, and flexible power transmission means operatively connecting said mixer power unit with said mixer element to drive the latter, said transmission means including a manually operable clutch and an automatically operating coupling, said coupling being adapted to automatically disengage and engage when the truck body is raised to dumping position and returned to transit position respectively.

7. In combination, in a vehicle for conveying cementitious material and including a chassis and a propelling power unit, a dumping body carried by said chassis and including a mixing element mounted rotatively with respect to said body, a separate mixer power unit carried by said chassis independently of the body, and flexible power transmission means operatively connecting said mixer power unit with said mixer element to drive the latter, said transmission means including a manually operable clutch, operable from a point adjacent the driver's seat, and an automatically operating coupling, said couping being adapted to automatically disengage and engage when the truck body is raised to dumping position and returned to transit position respectively.

8. In combination, in a vehicle for conveying cementitious material and including a chassis and a propelling power unit, a dumping body carried by said chassis and including a mixing element mounted rotatively with respect to said body, a separate mixer power unit carried by said chassis independently of the body, and flexible power transmission means operatively connecting said mixer power unit with said mixer element to drive the latter, said transmission means including a manually operable clutch and an automatically operating resilient coupling, said coupling being adapted to automatically disengage and engage when the truck body is raised to dumping position and returned to transit position respectively.

9. In combination, in a vehicle for conveying cementitious material and including a chassis and a propelling power unit, a body carried by said chassis and including a mixing element mounted rotatably with respect to said body, a separate mixer power unit carried by said chassis, and power transmission means including a safety element and operatively connecting said mixer power unit with said mixer element to drive the latter.

10. In combination, in a vehicle for conveying cementitious material and including a chassis and a propelling power unit, a body carried by said chassis and including a mixing element mounted rotatively with respect to said body, a separate mixer power unit carried by said chassis, and flexible power transmission means including a frangible element and operatively connecting said mixer power unit with said mixer element to drive the latter.

11. In combination, in a vehicle for conveying cementitious material and including a chassis and a propelling power unit, a dumping body carried by said chassis and including a mixing element mounted rotatively with respect to said body, a separate mixer power unit carried by said chassis, and flexible power transmission means including a frangible element and operatively connecting said mixer power unit with said mixer element to drive the latter.

12. In combination, in a vehicle for conveying cementitious material and including a chassis and a propelling power unit, a dumping body carried by said chassis and including a mixing element mounted rotatively with respect to said body, a separate mixer power unit carried by said chassis, and flexible power transmission means operatively connecting said mixer power unit with said mixer element to drive the latter, said transmission means including a frangible element, a manually operable clutch and an automatically operating coupling, said coupling being adapted to automatically disengage and engage when the truck body is raised to dumping position and returned to transit position respectively.

13. In combination, in a vehicle for conveying cementitious material and including a chassis and a propelling power unit, a dumping body carried by said chassis and including an agitating element, means for moving said body to a dumping position, a separate mixer power unit carried by said chassis, and flexible power transmission means to transmit motion from said power unit to said agitating element, said power transmission means including a clutch accessible to the operator of the vehicle while in transit for operating said clutch, a shaft driven from said clutch and supported in suitable bearings on said chassis, and means between said shaft and said agitator element for providing a driving connection therebetween automatically disconnectible when the body is moved to dumping position, and automatically connectible when the body is returned to transit position.

14. In combination, in a vehicle for conveying cementitious material and including a chassis and a propelling power unit, a dumping body carried by said chassis and including an agitating element, means for bodily elevating and moving said body to a dumping position, a separate mixer power unit carried by said chassis, and flexible power transmission means to transmit motion from said power unit to said agitating element, said power transmission means including a clutch accessible to the operator of the vehicle while in transit for operating said clutch, a shaft driven from said clutch and supported in suitable bearings on said chassis, and means between said shaft and said agitator element for providing a driving connection therebetween automatically disconnectible when the body is moved to dumping position, and automatically connectible when the body is returned to transit position.

15. In combination, in a vehicle for conveying cementitious material and including a chassis and a propelling power unit, a dumping body carried by said chassis and including an agitating element, means for moving said body to a dumping position, a separate mixer power unit carried by said chassis, and flexible power transmission means to transmit motion from said power unit to said agitating element, said power transmission means including a clutch accessible to the operator of the vehicle while in transit for operating said clutch, a shaft including a flexible element driven from said clutch and supported in suitable bearings on said chassis, and means between said shaft and said agitator element for providing a driving connection therebetween automatically disconnectible when the body is moved to dumping position, and automatically connectible when the body is returned to transit position.

16. In combination, in a vehicle for conveying cementitious material and including a chassis and a propelling power unit, a dumping body carried by said chassis and including an agitating element, means for bodily elevating and moving said body to a dumping position, a separate mixer power unit carried by said chassis, and flexible power transmission means to transmit motion from said power unit to said agitating element, said power transmission means including a clutch accessible to the operator of the vehicle while in transit for operating said clutch, a shaft driven from said clutch and supported in suitable bearings on said chassis, and means between said shaft and said agitator element for providing a driving connection therebetween automatically disconnectible when the body is moved to dumping position, and automatically connectible when the body is returned to transit position, and a frangible element in said transmission means.

17. In combination, in a vehicle for conveying cementitious material and including a chassis and a propelling power unit, a dumping body carried by said chassis and including an agitating element, means for moving said body to a dumping position, a separate mixer power unit carried by said chassis, and flexible power transmission means to transmit motion from said power unit to said agitating element, said power transmission means including a clutch accessible to the operator of the vehicle while in transit for operating said clutch, a shaft including a flexible element driven from said clutch and supported in suitable bearings on said chassis, and means between said shaft and said agitator element for providing a driving connection therebetween automatically disconnectible when the body is moved to dumping position, and automatically connectible when the body is returned to transit position, and a frangible element in said transmission means.

18. In combination, in a vehicle for transporting cementitious material and including a chassis and a power unit, a body carried by said chassis and including a mixing element mounted rotatively with respect to said body, a separate mixer power unit mounted on said chassis beneath said body, and power transmission means operatively connecting said mixer power unit with said mixer element to drive the latter.

19. In combination, in a vehicle for transporting cementitious material and including a chassis and a power unit, a body carried by said chassis and including a mixing element mounted rotatively with respect to said body, a separate mixer power unit slung low on said chassis beneath said body, and power transmission means operatively connecting said mixer power unit with said mixer element to drive the latter.

In testimony whereof we have affixed our signatures.

OTA T. GRAHAM.
OAKLEY J. GRAHAM.